Patented Jan. 16, 1923.

1,442,340

UNITED STATES PATENT OFFICE.

PAUL HILDEBRANDT, OF HAMBURG, GERMANY, ASSIGNOR, BY MESNE ASSIGNMENTS, TO THE CHEMICAL FOUNDATION, INC., A CORPORATION OF DELAWARE.

PROCESS FOR THE PRODUCTION OF MEAT-EXTRACTLIKE PREPARATIONS.

No Drawing. Application filed December 26, 1917. Serial No. 208,863.

*To all whom it may concern:*

Be it known that I, PAUL HILDEBRANDT, citizen of the Empire of Germany, residing at Hamburg, Germany, have invented new and useful Improvements in a Process for the Production of Meat-Extractlike Preparations, of which the following is a specification.

In my copending application, Serial No. 208,862, filed Dec. 26, 1917, I described a process by which I can prepare meat-extract like preparations by the action of acid liquors on albuminous animal waste of any kind. Unfortunately, not all kinds of animal residues yield by that treatment a product of good taste and pleasant smell, inasmuch as the preparations obtained sometimes have a disagreeable taste. As a result of investigations I have found, that such bad taste is due to some matter, which can be extracted either by means of solvents from the raw material or can be driven off by introducing steam into the raw material or into the solutions formed by the hydrolysis of albumenoid matter.

The object of my invention is therefore the removal of the disagreeable taste and smell from the preparations produced by the hydrolytic decomposition of albumenoid matter, or in other words—the improvement of the taste of those meat-extract like preparations. This is brought about by extracting or treating the raw material with fat solvents, like benzene, ether, alcohol, etc. The same result can also be attained by allowing live steam to act on the raw material or by a continued boiling of the solutions obtained by hydrolysis, the steam evolved carrying away the matter possessing a bad smell and unpleasant taste. Sometimes it is necessary to continue the boiling until the solution has a pasty appearance in a cold state. In that case, the residue is diluted with water and the boiling must be repeated until all the smell has disappeared. The same treatment can be applied with good success if the hydrolysis is carried out by alkalies.

What I claim is:—

A process for the production of palatable meat-extract like preparations from albuminous animal waste, consisting in treating the raw material with fat solvents, and thereafter subjecting it to hydrolysis.

In testimony whereof I have signed my name to this specification in the presence of two subscribing witnesses.

PAUL HILDEBRANDT.

Witnesses:
 EDUARD SIEBRAND,
 WALTER AHRENS.